(12) United States Patent  (10) Patent No.: US 6,927,390 B2
Mickael  (45) Date of Patent: Aug. 9, 2005

(54) GAMMA RAY SPECTROSCOPY LOGGING-WHILE-DRILLING SYSTEM

(76) Inventor: Medhat Mickael, 4910 Randall Oak, Sugar Land, TX (US) 77478

(*) Notice: Subject to any disclaimer, the term of this patent is extended or adjusted under 35 U.S.C. 154(b) by 0 days.

(21) Appl. No.: 10/267,944

(22) Filed: Oct. 8, 2002

(65) Prior Publication Data

US 2004/0065823 A1 Apr. 8, 2004

(51) Int. Cl.$^7$ ................................................. G01V 5/00
(52) U.S. Cl. ...................................................... 250/254
(58) Field of Search ................................ 250/254, 256, 250/267, 269.1, 269.6

(56) References Cited

U.S. PATENT DOCUMENTS

| | | | |
|---|---|---|---|
| 3,521,064 A | | 7/1970 | Moran et al. |
| 3,780,302 A | * | 12/1973 | Arnold et al. ........... 250/269.6 |
| 4,055,763 A | | 10/1977 | Antkiw |
| 4,208,580 A | | 6/1980 | Schweitzer et al. |
| 4,317,993 A | | 3/1982 | Hertzog et al. |
| 4,722,220 A | | 2/1988 | Herron |
| 4,810,876 A | | 3/1989 | Wraight et al. |
| 4,903,527 A | | 2/1990 | Herron |
| 4,904,865 A | * | 2/1990 | Meisner et al. ............. 250/254 |
| 4,978,851 A | * | 12/1990 | Youmans .................. 250/269.6 |
| 5,250,806 A | | 10/1993 | Rhein-Knudsen et al. |
| 5,440,118 A | | 8/1995 | Roscoe |
| 5,471,057 A | | 11/1995 | Herron |
| 5,786,595 A | | 7/1998 | Herron et al. |

* cited by examiner

Primary Examiner—Constantine Hannaher

(57) ABSTRACT

A system for measuring elemental compositions and other properties of earth formation penetrated by a borehole, wherein the measurements are made while drilling the borehole. The downhole instrumentation includes a neutron source and a gamma ray detector disposed in a drill collar. Formation parameters of interest are determined from the energy and intensity of gamma radiation induced in the formation by the neutron source. By minimizing the amount of iron in the immediate vicinity of the gamma ray detector, disposing no iron directly between the detector and the formation, and positioning the gamma ray detector as close as practical to the formation, interfering gamma radiation from iron is reduced thereby increasing precision and accuracy of the formation parameter measurements.

27 Claims, 6 Drawing Sheets

(A-A')

(B – B')

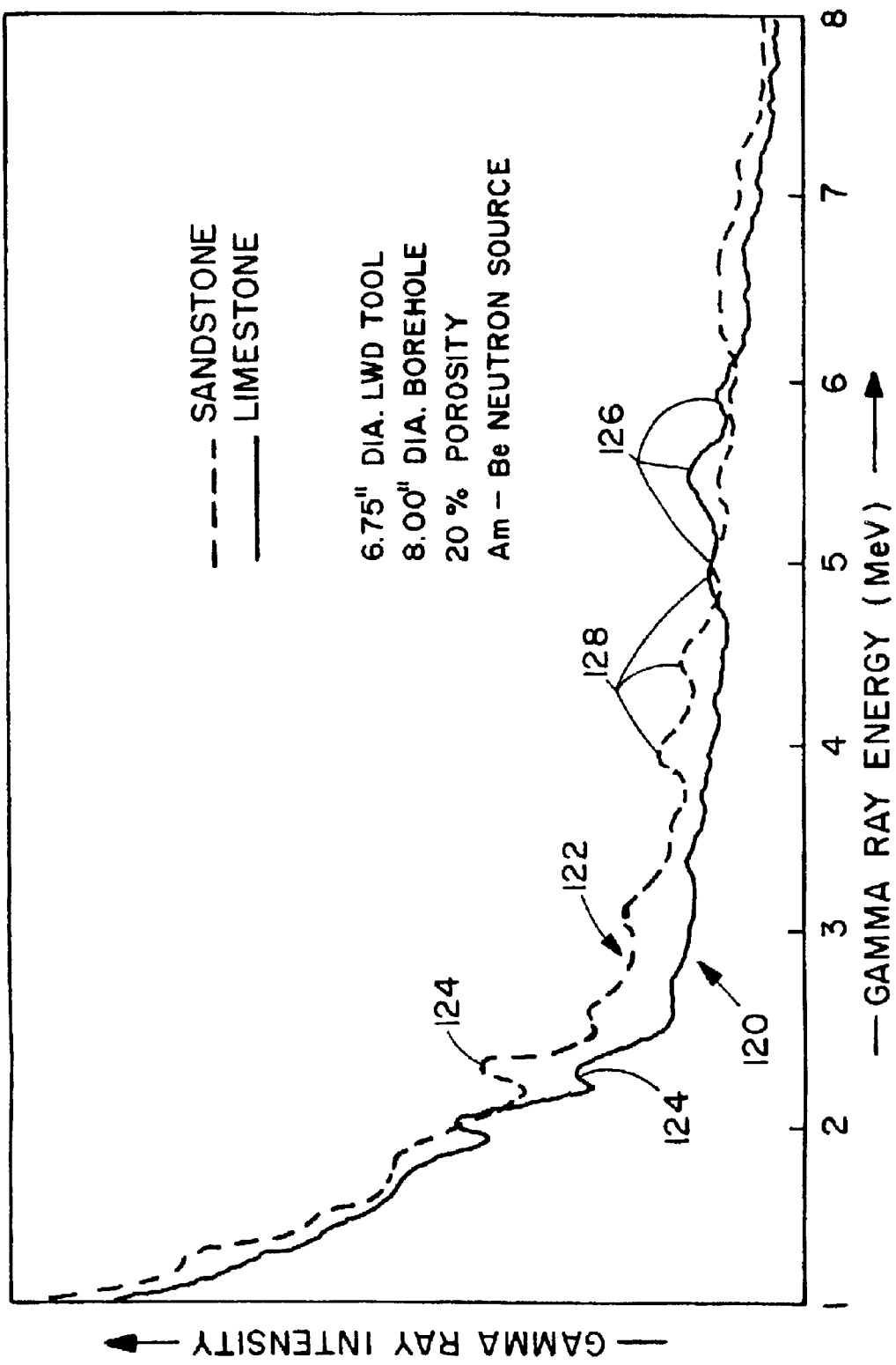

GAMMA RAY SPECTROSCOPY LOGGING-WHILE-DRILLING SYSTEM

This invention is related to the detection of parameters of materials, and more particularly to measuring elemental compositions of earth formation penetrated by a borehole, wherein the measurements are made while drilling the borehole.

BACKGROUND OF THE INVENTION

Knowledge of earth formation elemental composition is useful in a wide variety of fields including mining, hydrology, geology, and hydrocarbon production. More specifically, elemental compositions of elements in formations penetrated by a borehole are used to determine a wide range of physical, lithologic and fluid saturation properties of the formation. The term "elemental composition" used in this disclosure refers to both the detection of the presence of an element and also to the measure of the amount or "concentration" of an element in the formation.

Several examples of uses of elemental composition measurements are listed below. These examples are by no means intended to be an all-inclusive list of uses of elemental composition measurements in earth formations. Detection of silicon (Si) can indicate that the formation is sandstone or shale. Detection of calcium (Ca) can indicate that the formation is limestone or dolomite (carbonates). Detection of magnesium (Mg) can indicate that the formation is dolomite. Detection of chlorine (Cl) can indicate that the formation is saturated with saline water, since significant amounts of chlorine are usually not found in common rock matrices such as sandstone, limestone and dolomite. A measure of hydrogen content can be used to determine formation porosity, since major concentrations of hydrogen are found in fluid saturating the formation rather than in the formation matrix.

Elemental composition can be measured using a number of techniques. Element concentration measurement techniques applicable to a borehole environment are much more limited.

One borehole technique comprises irradiating a formation with a source of gamma radiation disposed within a tool conveyed within the borehole, and measuring the intensity of low energy radiation back-scattered by the borehole environs into the tool using a gamma ray detector. Back-scattered radiation is measured in a relatively low energy range of the gamma ray spectrum dominated by the photoelectric effect. This photoelectric, or "Pe" radiation, can be related to formation elemental composition. Since the energy of gamma radiation is relatively low, the measurement is adversely affected by the near borehole environs including drilling fluid or "mud" within the borehole, and also by the structure of the tool. Pe measurements are severely degraded in boreholes drilled with heavy drilling muds weighted with barite or other materials with large atomic weights.

A second borehole elemental composition measurement technique comprises irradiating a formation with a source of neutrons disposed within a tool conveyed within the borehole, and measuring the intensity and energy of induced gamma radiation using a gamma ray detector disposed within the tool. If an isotopic or "chemical" source of neutrons is used, such as a source comprising a mixture of americium (Am) and beryllium (Be), most measured gamma radiation results from the capture of thermal neutrons by elements in the formation and borehole environs. Furthermore, individual nuclei, upon capture of thermal neutrons, emit gamma radiation at characteristic energies and at characteristic relative intensities. A measure of energy and relative intensity of capture radiation, commonly referred to as a capture gamma ray "spectrum", can be used to identify the presence of certain elements. A measure of the intensity of the spectrum from a given element can be used to determine the concentration of that element. Ratios of characteristic energies can be indicative of relative concentrations of elements. Thermal capture radiation energies for many common elements in earth formations are significantly greater than the previously discussed photoelectric energy range. Thermal capture radiations at higher energies are, therefore, less adversely affected by the absorptive properties of the near borehole environs including the borehole mud and the tool. The tool, however, does present another problem in elemental composition measurements using thermal capture gamma radiation. Most tools comprise a significant amount of steel, especially in the pressure housing which protects the internal components of the tool from the harsh borehole environment. Iron (Fe) contained in steel produces capture gamma radiation with energies and intensities that interfere with capture gamma radiation from elements of interest.

Borehole tools, which are used to measure "logs" of parameters of interest as a function of depth within the borehole, typically fall into two categories. The first category is "wireline" tools wherein a "logging" tool is conveyed along a borehole after the borehole has been drilled. Conveyance is provided by a wireline with one end attached to the tool and a second end attached to a winch assembly at the surface of the earth. The second category is logging-while-drilling or "LWD" tools, wherein the logging tool is conveyed along the borehole by a drill string, and measurements are made with the tool while the borehole is being drilled. Steel in wireline logging tools produces interfering capture gamma radiation from Fe, but spectral processing can be used with good results to separate the Fe "noise" from induced radiation in Ca, Si, H, Cl and the like. LWD tools are usually disposed in the walls of a drill collar in the drill string. The drill collar wall serves as a pressure housing for the tool. Walls of the drill collar are steel and are typically several inches thick. Steel pressure housings of wireline tools are typically at least an order of magnitude thinner. There is, therefore, much more iron surrounding an LWD tool than surrounding a wireline logging tool. Since elemental spectral intensity increases as a function of element concentration for a given tool configuration and neutron source strength, interference from Fe in LWD tools is at least an order of magnitude greater than interference from Fe in wireline tool.

Gamma ray spectroscopy measurements made with a gamma ray detector imbedded within a collar of an LWD tool are typically fatally flawed by intense interference from gamma radiation resulting from thermal neutron capture in Fe. Furthermore, Pe measurements made with a gamma ray detector imbedded within the collar of an LWD tool is typically fatally flawed by excessive absorption of gamma radiation in the photoelectric range by Fe.

BRIEF DESCRIPTION OF THE DRAWINGS

In the accompanying drawings:

FIG. 7 shows composite capture gamma ray spectra measured in a water saturated sandstone formation and in a water saturated limestone formation.

EMBODIMENTS

The invention can be used to measure elemental composition of any material penetrated by a borehole. The system embodied as a logging-while-drilling (LWD) system will be disclosed in detail.

Figure 1:
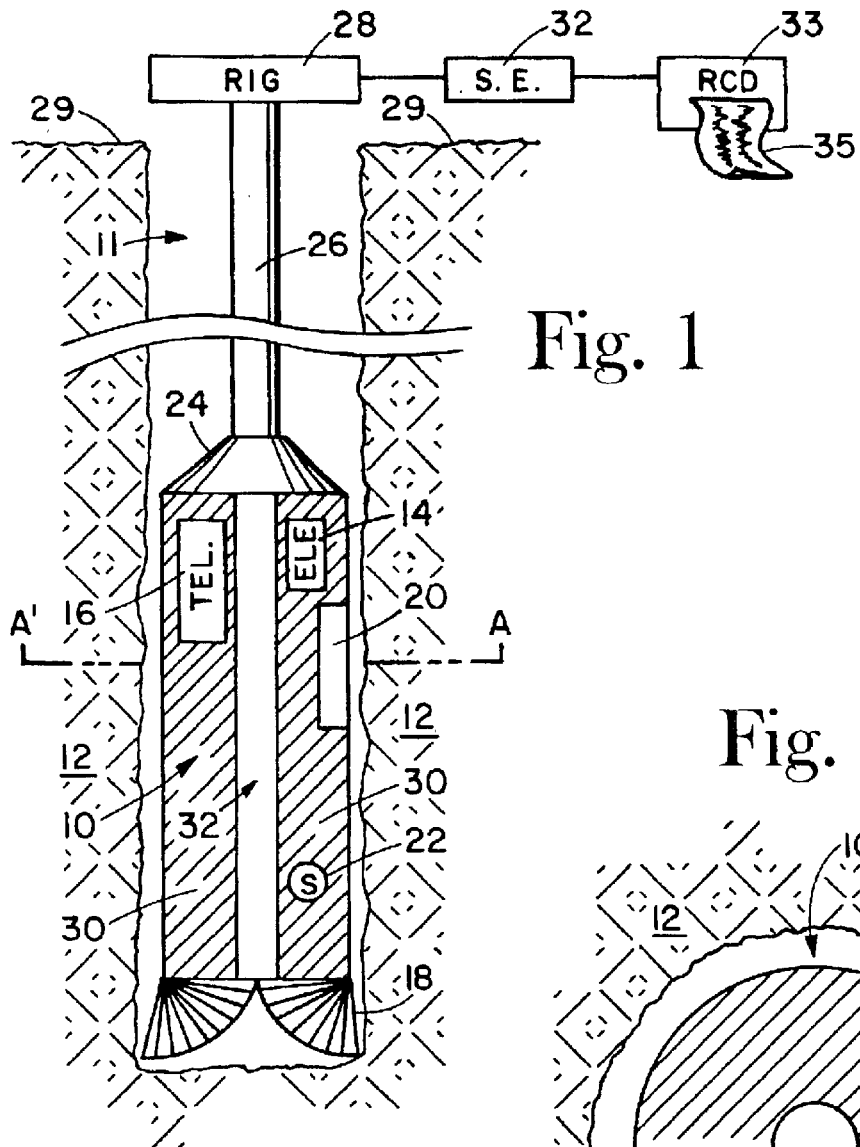
FIG. 1 illustrates an LWD logging tool comprising a gamma ray detector assembly and a neutron source, wherein the tool is configured within a drill collar and suspended in a well borehole by a drilling rig.

FIG. 1 illustrates an LWD logging tool 10 comprising a collar wall 30 surrounding a conduit 32 through which drilling fluid flows during drilling operation. Within the collar wall 30 is disposed a radiation source 22. The source 22 is preferably an isotopic neutron source such as Am—Be. Alternately, a neutron generator producing pulses of neutrons at energy of about 14 million electron Volts (MeV) can be used. The logging tool 10 also comprises a gamma radiation detector assembly 20 disposed at the outer surface of the collar wall 30, and axially spaced from the neutron source 22. Details of the position of the gamma ray detector assembly 20 will be discussed in detail in subsequent sections of this disclosure, and fully illustrated in subsequent drawings. An electronics package 14 provides power and control for the detector assembly 20 of the logging tool 10. The electronics package 14 can optionally contain data processing circuitry to process the response data of the detector assembly 20, such as circuits to determine the intensity and energy of gamma radiation impinging upon the radiation detector assembly. Furthermore, the electronics package 14 can optionally contain memory to store unprocessed and processed data for subsequent retrieval when the tool 10 is returned to the surface of the earth 29. The electronics package 14 can optionally contain a processor to transform measured radiation energy and intensity into one or more parameters of interest. The tool 10 also comprises a telemetry system 16 that can be used to telemeter unprocessed, partially processed, or fully processed detector assembly response data to the surface of the earth 29.

Still referring to FIG. 1, the tool 10 is conveyed along a borehole 11 penetrating an earth formation 12 by a conveyance system that includes a drill string 26 with a first end operationally connected to the tool 10 using a suitable connector 24. The drill string 26 extends to the surface of the earth 29 and has a second end operationally connected to a rotary drilling rig. The rotary drilling is illustrated conceptually by the block 28, since rotary drilling rigs and cooperating drill string 26 are well known in the art. The tool 10 is terminated by a drill bit 18, which advances the borehole 11 as the drill string and attached collar is rotated by the drilling rig 28. Surface equipment 32 is shown operationally connected to the drilling rig 28. The surface equipment 32 can optionally contain a processor to compute parameters of interest from detector response data telemetered to the surface by the telemetered system 16. Processed data can be output as a log 35 of one or more parameters of interest, as a function of depth, by a recorder 33. It should be understood that the log 35 could be a digital recording or a "hard copy" recording.

The disposition of the detector assembly 20 is not limited to a drill collar. The assembly 20 can alternately be disposed within an open cavity in other types of tubular members that comprise a drill string.

Figure 2:
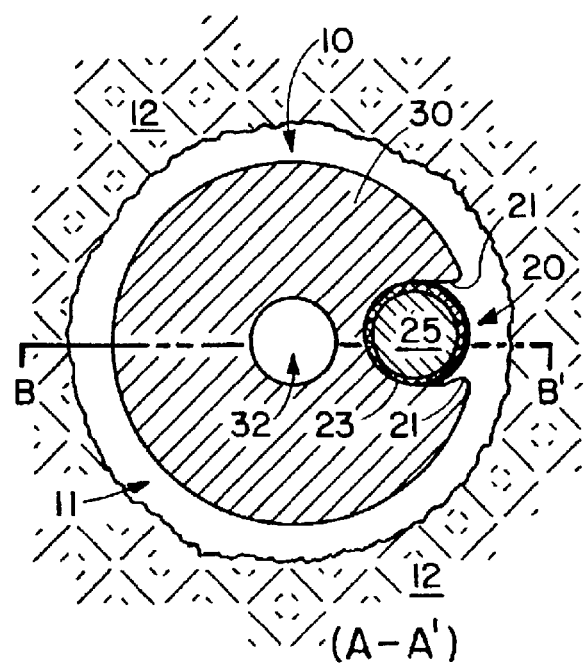
FIG. 2 is a horizontal sectional view of the logging tool through the gamma ray detector assembly of the logging tool.

FIG. 2 is a cross sectional view of the tool 10 through the detector assembly 20 at A-A'. As discussed above, drilling fluid flows through conduit 32 penetrating the collar wall 30. A cavity defined by the surface 21 is formed on the outer surface of the collar wall 30 to receive the detector assembly 20. The detector assembly 20 comprises a gamma ray detector 25 encased in a pressure housing 23. The inner wall 21 of the cavity is preferably contoured to follow the essentially cylindrical housing 23. The pressure housing 23 is fabricated from material that is relatively transparent to gamma radiation impinging thereon, but is impermeable and with physical strength to protect the detector 25 from high pressures and fluids typically encountered in a borehole environs. The detector 25 responds to both the energy and the intensity of impinging gamma radiation, and is preferably a scintillation type gamma ray detector comprising a scintillation crystal optically coupled to a photon responsive device such as a photomultiplier tube. The detector assembly 20 does not protrude outside of a radius defined by the outer surface of the collar wall 30.

The cavity within the collar wall 30 will be referred to as an "open" cavity in that the cavity and detector assembly 20 disposed within are not covered by any type of plate, insert or shroud. Alternately, the cavity and detector 20 can be covered by a thin sleeve (not shown). The detector assembly 20 is disposed within the cavity in the collar wall 30 so that a side of the assembly 20 is exposed to the borehole environs with no intervening collar material.

Still referring to FIG. 2, it should be noted that the positioning of the detector assembly 20 minimized the amount of intervening material between the detector 25 and the formation 12, while still providing protection for the detector assembly 20 when the rotary drilling assembly is rotated to advance the borehole 11. The detector assembly 20 does not protrude outside of a radius defined by the outer wall of the collar. It should also be noted that no collar material, which is typically steel, is disposed between the detector assembly 20 and the annulus defined by the outer surface of the collar wall 30 and the wall of the borehole 11. By (a) minimizing the amount of iron in the immediate vicinity of the detector assembly 20, (b) disposing no iron directly between the detector assembly and the formation, and (c) by positioning the detector assembly 20 as close as practical to the formation 12, absolute and relative intensity of capture gamma radiation from Fe is reduced substantially from that which would be observed if the detector were imbedded within the collar wall 30. This geometry allows spectroscopic measurement of elements of interest in the presence of a greatly reduce background form neutron capture in Fe.

Figure 3:
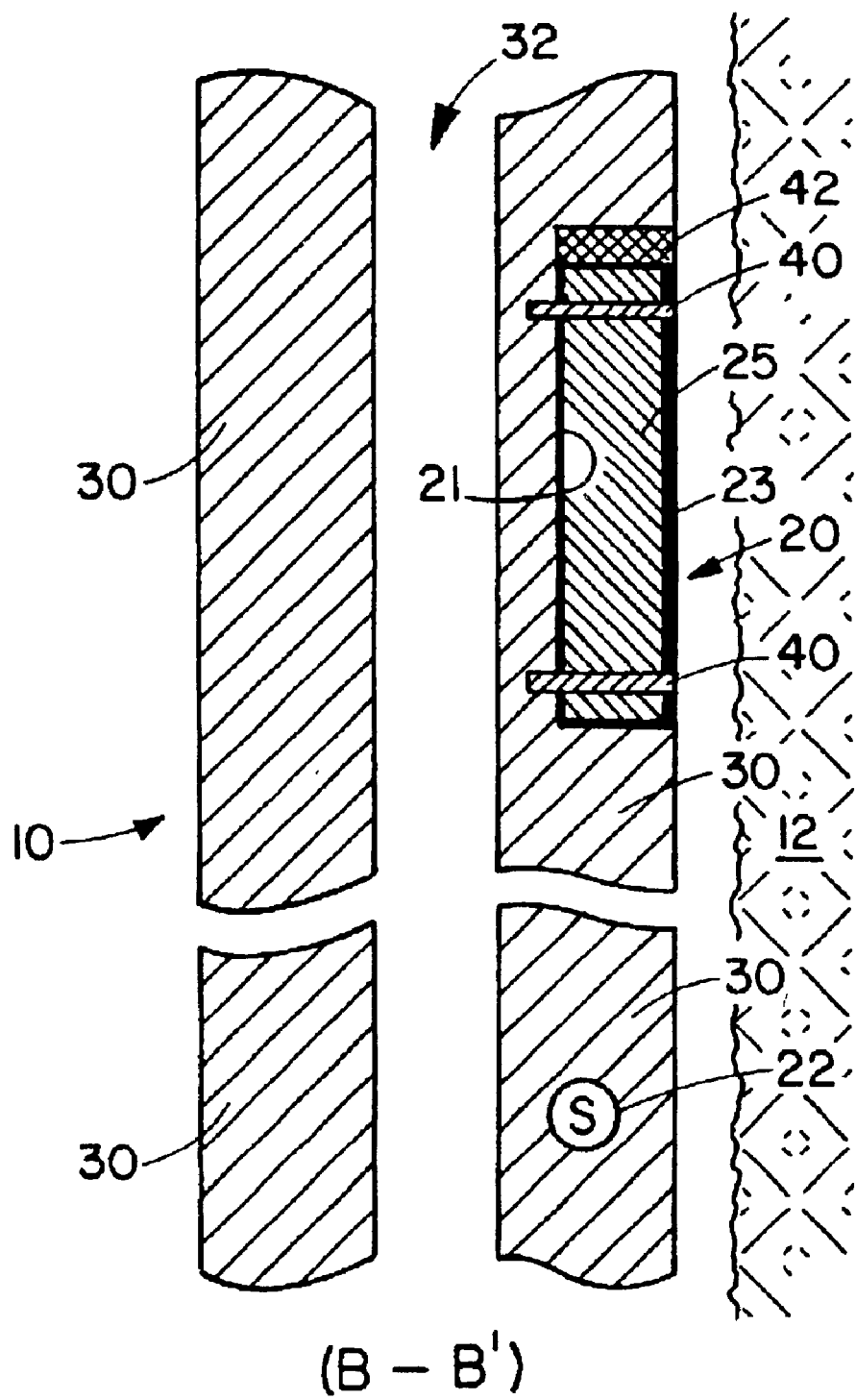
FIG. 3 is a vertical sectional view of the gamma ray detector assembly.

FIG. 3 is a vertical sectional view of the tool 10 at B-B' (see FIG. 2). The detector assembly 20 is preferably removably disposed within the open cavity, defined by the cavity walls 21 in the collar wall 30, by at least one clamping means. Two clamping means are shown conceptually at 40. Examples of clamping means are (a) straps which encompass the detector assembly 20 and which are anchored to the collar wall 30, (b) screws which pass through the detector assembly and thread into the open cavity in the wall 30, or (c) a tab and screw/clamp arrangement in which a tab on one end of the detector assembly fits into a receiving slot in the collar wall, and the opposing end of the detector assembly is removably affixed to the collar wall using one of the above clamping means (a) or (b). It will be recognized by those skilled in the art that other means can be used to removably attach the detector assembly 20 within the open cavity. The detector assembly 20 is electrically connected to the electronics package 14 (see FIG. 1) through a connector 42. FIG. 3 clearly illustrates that the present invention positions the detector assembly 20 as close as possible to the formation 12 while still maintaining the detector within the outer surface of the collar wall 30. This geometric arrangement, in turn, minimizes interfering capture gamma radiation from Fe as previously discussed.

The detector assembly 20 can alternately be permanently disposed within the open cavity defined by the surfaces 21 in the collar wall 30.

Again referring to FIG. 3, the centerline of the detector assembly 20 is preferably radially aligned (as near as mechanically practical) with the centerline of the neutron source 22. This geometrical arrangement optimizes count rate recorded by the detector assembly for a given axial source-detector assembly spacing, source strength and other fixed physical parameters of the tool 10. Optimized count rate minimizes statistical uncertainty in the gamma radiation measurements.

Figure 4A:
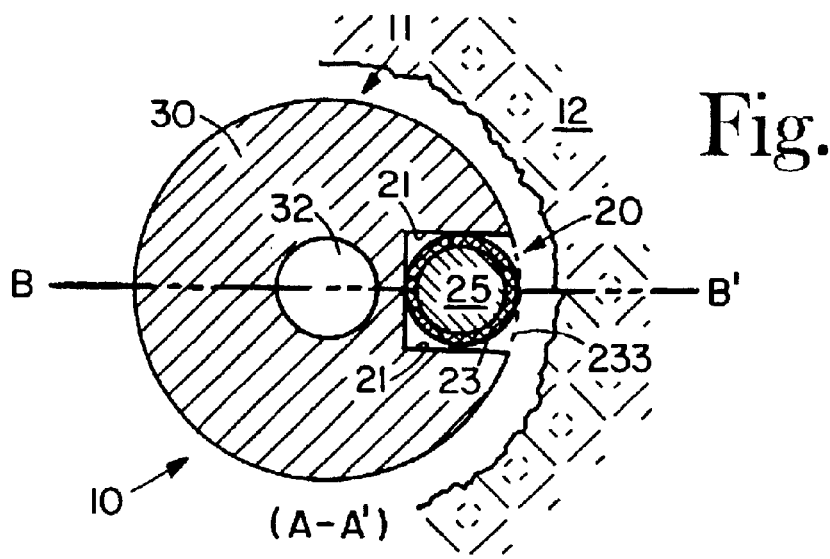
FIG. 4a is a first embodiment of the gamma ray detector assembly in an open cavity in the outer surface of the wall of the drill collar.

The shape of the open cavity defined by the surfaces 21 in the collar wall 30 can be varied, as can the pressure housing 23 of the detector assembly 20. As illustrated in FIG. 2, the inner wall 21 of the cavity is preferably contoured to follow the essentially cylindrical pressure housing 23. From a manufacturing perspective, it may be less expensive to machine a rectangular cavity as illustrated in the cross sectional view of the tool 10 at A-A', as shown in FIG. 4a. The detector assembly is positioned within the open cavity so that it does not protrude outside of a radius 233, which is the radius of the outer surface of the collar wall 30. Alternately, for reasons of physical strength, the geometrical arrangement shown in the tool cross sectional view A-A' in FIG. 4b can be used. The inner wall 21 of the open cavity can is contoured to follow an essentially cylindrical housing 23 on one side of the detector assembly 20. The contour 123 of the opposing side of the detector housing 23 matches the radius of the outer surface of the collar wall 30. Using this embodiment, there are no voids in the cavity in that the detector housing 23 completely fills the cavity, and the detector assembly 20 again does not protrude outside of the radius defined by the outer surface of the collar wall 30.

It was previously mentioned that, from a measurement perspective, it is desirable to radially align the detector assembly 20 and the neutron source 22. The open cavity in the collar wall 30 defined by the surfaces 21 creates a region of mechanical weakness in the collar wall. A cavity used to receive the source 22, although not disposed at the outer surface of the collar wall 30, also creates another region of weakness in the collar wall 30. Radially aligning these two regions of weakness may weaken the overall collar structure to an unacceptable level. The collar can be strengthen by radially offsetting the detector assembly 20 and the source 22 are shown in the cross sectional view A-A' of FIG. 4c. The source 22 is illustrated with a broken line to signify that it does not lie in the plane A-A', and is axially spaced from the detector assembly as illustrated in FIGS. 1 and 3. Radial offset is defined by the angle $\theta$ shown at 44. Increasing the angle $\theta$ increases the overall strength of the collar assembly, but degrades the measurement of the tool for reasons previously discussed. If it is necessary to use an offset of $\theta$ greater than zero, the magnitude of $\theta$ should be minimized within the guidelines of structural strength required of the tool 10.

Figure 4B:
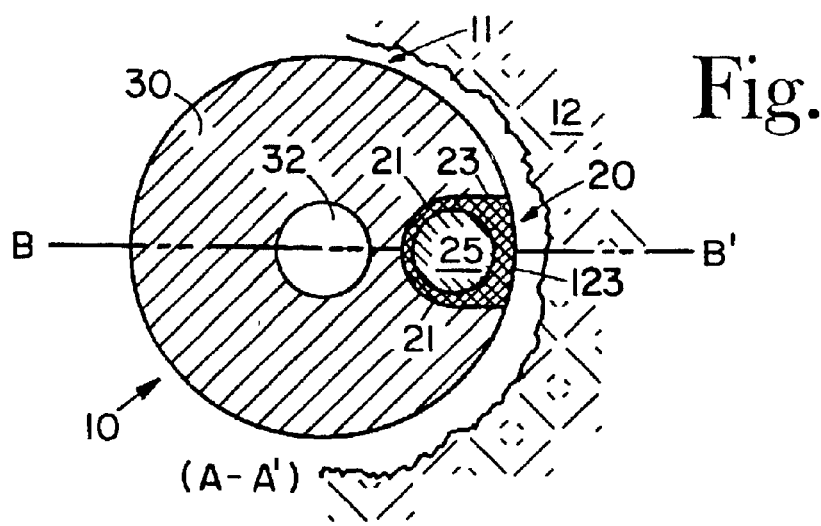
FIG. 4b is a second embodiment of the gamma ray detector assembly in an open cavity in the outer surface of the wall of the drill collar.
Figure 4C:
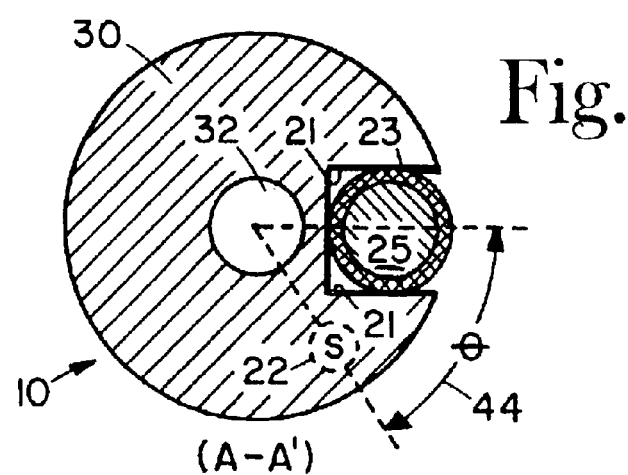
FIG. 4c illustrates the gamma ray detector assembly radially displaced from the neutron source.

FIGS. 4a–4c again illustrate that the detector assembly 20 is disposed in the open cavity of the collar wall 30 so that a side of the detector assembly is exposed to the borehole environs with no intervening collar material.

Figure 5:
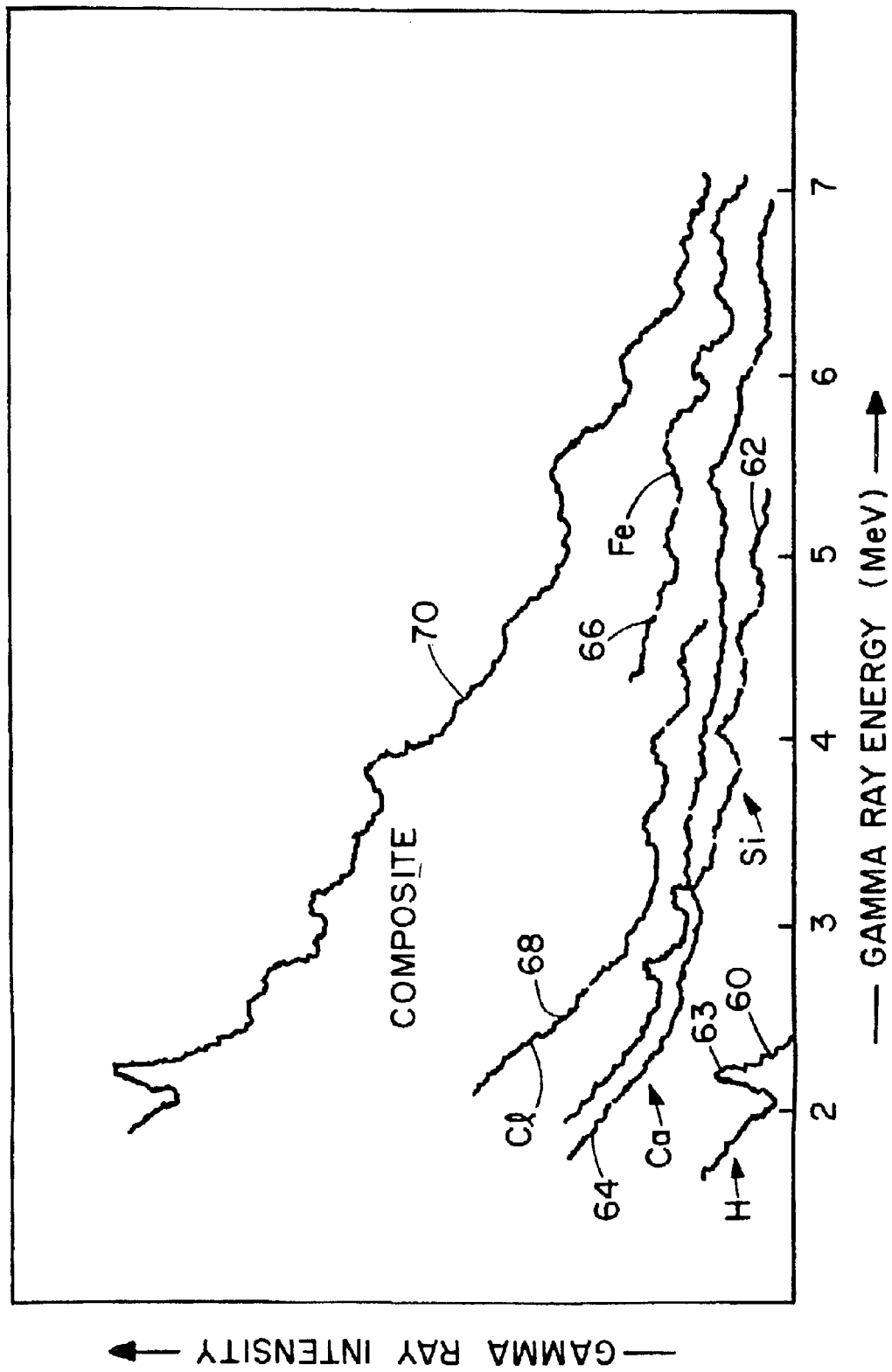
FIG. 5 illustrates several elemental gamma ray spectra and a composite gamma ray spectrum measured by the gamma ray detector assembly.

FIG. 5 is a plot of gamma ray intensity (ordinate) as a function of gamma ray energy (abscissa). Several spectra resulting from neutron capture by specific elements are shown. The full energy range of each spectrum is not shown for purposes of clarity. Curve 60 represents a gamma ray spectrum resulting from thermal neutron capture by H, showing a characteristic capture gamma radiation peak 63 at 2.22 MeV. Curve 62 represents a gamma ray spectrum resulting from thermal neutron capture by Si. Curve 64 represents a gamma ray spectrum resulting from thermal neutron capture by Ca. Curve 68 represents a gamma ray spectrum resulting from thermal neutron capture by Cl. Curve 66 represents a gamma ray spectrum resulting from thermal neutron capture by Fe. Curve 70 represents a combination or "composite" of curves 60, 62, 64, 66 and 68. The composite spectrum 70 would be the type measured by the detector assembly 20 in a borehole environ containing H, Si, Ca, Cl and Fe. It should be understood that additional elements that produce thermal capture gamma radiation can be present in the borehole environs. If these additional elements are present in sufficient concentrations, they also will contribute to the measured composite spectrum 70.

Still referring to FIG. 5, the curves 60, 62, 64, 66 and 68 all show characteristic gamma radiation peak structure used to identify and to quantify elemental composition of the borehole and formation environs. It is apparent that Fe exhibits significant high-energy peak structure in the same energy region as high-energy peak structure from Ca. If the Fe component 66 is excessively large and dominates the composite spectrum 70, it is very difficult to extract the Ca component 64 from the composite spectrum. As a result, it is very difficult to obtain a meaningful quantitative or even qualitative measure of the element Ca in the borehole environs. Furthermore, if the Fe component 66 dominates the composite spectrum 70, it is very difficult to obtain a meaningful qualitative or quantitative measure of any other element in the borehole environs. Recall that Fe is found primarily in the collar wall 30 rather than in the formation or borehole fluid. Therefore, (a) by minimizing the amount of iron in the immediate vicinity of the detector assembly 20, (b) by exposing a significant area of the detector assembly to the borehole environs with no intervening collar material, and (c) by positioning the detector assembly as close as practical to the formation 12, spectral component 66 from Fe is minimized with respect to the composite spectrum 70. This allows components from other elements to be extracted from the composite spectrum 70 with improved accuracy and precision, resulting in improved elemental composition measurements by the logging system.

Figure 6:
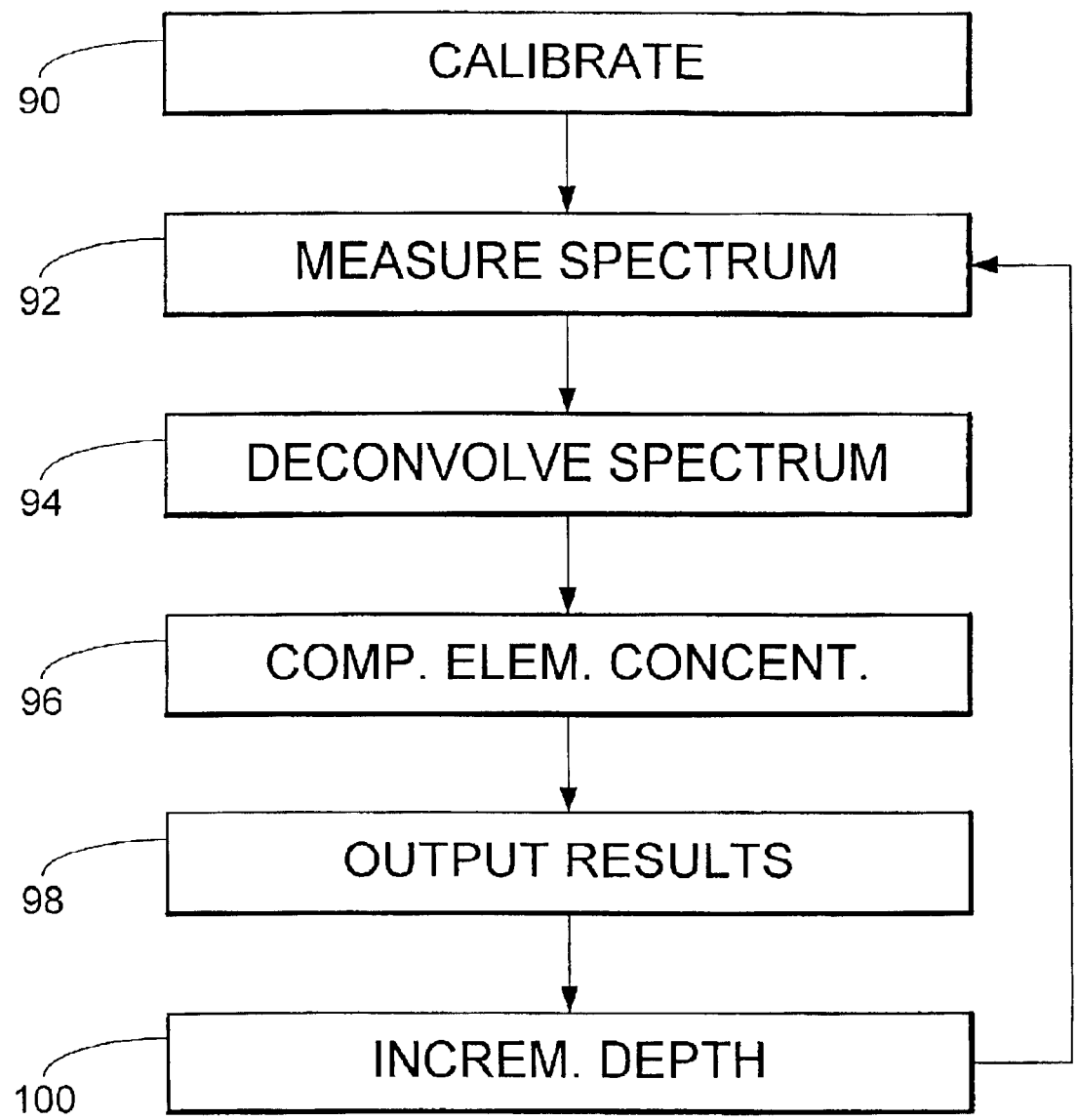
FIG. 6 is a flow chart of the logging system data processing.

FIG. 6 is a flow chart of data acquisition and processing. The system is calibrated at step 90. Capture gamma ray spectra from individual elements are determined for given tool parameters and borehole conditions. These spectra, often referred to as "library" or "reference" spectra, are stored either in the electronics package 14 or surface equipment 32 (see FIG. 1). Once calibrated, the tool is conveyed along the borehole and composite spectra are measured over discrete borehole depth intervals at step 92 as the borehole is advanced by the action of the drill bit.

Components from thermal neutron capture in individual elements (Ca, Si, H, Cl, etc) are extracted or "deconvolved" from the measured composite spectrum at step 94 of FIG. 6. This can be accomplished using a variety of techniques including (a) measuring gamma radiation in energy regions or "windows" which encompass characteristic gamma radiation from the various elements, and subsequently combining the measured energy windows, (b) normalizing the library spectra and sequentially subtracting the normalized library spectra from the composite spectrum (commonly known as "spectrum stripping"), or (c) fitting the library spectra to the composite spectrum using least-squares or other techniques (commonly known as "spectrum fitting").

Ratios of elemental concentrations rather than absolute measures of elemental concentrations also offer valuable production information. As an example, an energy window can be selected to encompass peak structure characteristic of thermal neutron capture in Ca, and the count rate within this window is measured. This will be referred to as the "Ca" window count rate. A second energy window can be selected to encompass peak structure characteristic of thermal neutron capture in Si, and the count rate within this window is also measured. This will be referred to as the "Si" window count rate. A ratio of the Ca count rate to the Si count rate, referred to as the "Ca/Si" ratio, is indicative of relative concentrations of Ca to Si in the formation. Since carbonates contain Ca and no Si, and sandstone contain Si but no Ca, the Ca/Si ratio will increase in carbonates formations and decrease in sandstone formations. The Ca/Si ratio can, therefore, be used as an indicator of formation lithology. Other window ratios can be formed to yield useful information. As an example, count rate in a window encompassing the hydrogen peak 63, divided by count rate in a window encompassing essentially the entire composite spectrum 70, can be used as a formation porosity indicator. This is because essentially all H is found in fluid filling pore space rather than in the formation matrix, and essentially all other elements are found in the formation matrix.

Once the measured composite spectrum has been deconvolved into contributions from individual elements or appropriate window count rate ratios have been formed, concentrations of elements or ratio indicators of formation properties are computed at step 96 as shown in FIG. 6. Quantitative elemental concentrations are obtained by combining constants obtained in the deconvolution process (step 94) with calibration constants obtained at the calibration step 90. Elemental concentrations or ratio indicators are recorded as a function depth at which they are measured at step 98. Depth is incremented at step 100 and steps 92 through 98 are repeated thereby forming a "log" of the composition measurements.

As mentioned previously, capture gamma ray measurements are used to provide valuable information in the production of hydrocarbons. As an example, in regions where it is known that hydrocarbon bearing formations are sandstones, accurate delineation between sandstone and limestone is critical. FIG. 7 shows composite spectra measured in a 8 inch borehole using a 6.75 inch diameter LWD tool with the gamma ray detector assembly 20 disposed in the open cavity in the outer surface of collar wall 30, as discussed above. Curve 122 was measured in a 20 percent porosity sandstone ($SiO_2$) formation saturated with fresh water ($H_2O$). Curve 124 was measured in a 20 percent porosity limestone ($CaCO_3$) formation also saturated in fresh water. The hydrogen peak 124 at 2.22 MeV from the saturating fluid is clearly seen in both spectra. The disposition of the gamma ray detector assembly, as discussed in detail above, minimizes the Fe contribution to the composite spectra 120 and 122. Note that the high-energy peak structure 126 from Ca is clearly visible. Also note that the characteristic peak structure 128 from Si is also clearly visible. These distinct differences in measured composite spectra permits either deconvolution of the composite spectra 120 and 122 at step 92 to obtain measures of Si and Ca concentration, or alternately the computation of a Ca/Si ratio as discussed above. Either technique can be used to delineate sandstone from limestone.

A measure of naturally occurring gamma radiation can be used to identify shales. There is no neutron source involved in this measurement, therefore there is no noise signal from neutron induced capture gamma radiation from iron. The disclosed positioning of the gamma ray detector assembly in the collar wall 30 does, however, maximize accuracy and precision of a "natural" gamma ray log. More specifically, exposing a significant area of the detector assembly 20 to the borehole environs with no intervening collar material minimizes gamma ray absorption within the tool and therefore maximizes count rate. Positioning the detector assembly 20 as close as practical to the formation 12 also minimizes gamma ray attenuation in the borehole fluid thereby maximizing count. Both features also preserve the spectral properties of the natural gamma radiation should deconvolution or rationing of count rate windows be used in the analysis of the measured data.

The logging tool 10 shown in FIG. 1 comprises only a gamma ray detector assembly 20. It should be understood that more than one gamma ray detector assembly can be used, and multiple gamma ray measurements can be combined to obtain other formation property measurements such as density. Furthermore, the tool 10 can include more than one neutron detector, whose responses are combined to obtain additional formation parameters such as "neutron" porosity.

One skilled in the art will appreciate that the present invention can be practiced by other that the described embodiments, which are presented for purposes of illustration and not limitation, and the present invention is limited only by the claims that follow.

What is claimed is:

1. A detector assembly:
   (a) comprising a gamma ray detector optically coupled to a photon responsive device and disposed within a pressure housing and responsive to energy and intensity of gamma radiation impinging thereon; and
   (b) disposed within an open cavity in an outer surface of a tubular disposed within a borehole.

2. The detector assembly of claim 1 wherein said detector assembly is cylindrical with a major axis essentially parallel to a major axis of said tubular.

3. The detector assembly of claim 1 wherein said tubular is a drill collar.

4. The detector assembly of claim 1 wherein:
   (a) said detector assembly is sized to be disposed within a radius defined by said outer surface of said tubular, and
   (b) said open cavity is configured so that a side of said pressure housing contacts the environs of said borehole.

5. A logging tool comprising:
(a) a drill collar; and
(b) a detector assembly responsive to energy and intensity of gamma radiation impinging thereon and disposed within an open cavity in an outer surface of said drill collar with a major axis of said detector assembly essentially parallel to a major axis of said drill collar.

6. The apparatus of claim 5 further comprising a neutron source disposed within said drill collar and axially spaced from said detector assembly.

7. The apparatus of claim 6 wherein said neutron source and said detector assembly are radially aligned.

8. The apparatus of claim 6 wherein said neutron source is an isotopic neutron source.

9. The apparatus of claim 6 wherein said drill collar is conveyable within a borehole by a drill string.

10. The apparatus of claim 9 wherein said detector assembly is an assembly responsive to energy and intensity of gamma radiation induced in environs of said borehole by said neutron source.

11. The apparatus of claim 5 wherein said detector assembly comprises:
(a) a pressure housing; and
(b) a scintillation detector and an optically coupled photomultiplier tube disposed within said pressure housing wherein a side of said pressure housing contacts environs of said borehole.

12. The apparatus of claim 5 wherein said detector assembly is an assembly sized to be disposed within a radius defined by said outer surface of said drill collar.

13. A method for measuring a property of material penetrated by a borehole, comprising:
(a) disposing, within an open cavity in an outer surface of a tubular disposed within a borehole, a detector assembly
 (i) comprising a gamma ray detector optically coupled to a photon responsive device and disposed within a pressure housing, and
 (ii) responsive to energy and intensity of gamma radiation impinging thereon; and
(b) using said gamma radiation energy and intensity response to obtain a measure of said property.

14. The method of claim 13 further comprising:
(a) disposing a neutron source within said tubular;
(b) measuring energy and intensity of gamma radiation induced in said material by neutrons from said neutron source; and
(c) using said measures of gamma radiation energy and intensity induced by said neutrons to obtain said measure of said property.

15. The method of claim 13 further comprising conveying said tubular within said borehole with a drill string.

16. The method of claim 13 further comprising:
(a) sizing said detector assembly for disposal in said open cavity within a radius defined by said outer surface of said tubular; and
(b) orienting said detector assembly so that a major axis of said detector assembly is essentially parallel to a major axis of said tubular; wherein
(c) a side of said detector assembly contacts environs of said borehole.

17. A method for measuring a parameter of a material penetrated by a borehole, comprising:
(a) providing a drill collar;
(b) disposing within an open cavity in an outer surface of said drill collar a detector assembly for measuring energy and intensity of gamma radiation impinging thereon wherein a major axis of said detector assembly is essentially parallel to a major axis of said drill collar; and
(c) using said measures of intensity and energy of said gamma radiation to determine said parameter.

18. The method of claim 17 further comprising disposing a neutron source within said drill collar and axially spaced from said detector assembly.

19. The method of claim 18 further comprising radially aligning said neutron source and said detector assembly.

20. The method of claim 18 wherein said neutron source is an isotopic neutron source.

21. The method of claim 17 wherein said detector assembly comprises:
(a) a pressure housing; and
(b) a scintillation detector optically coupled to a photomultiplier tube and disposed within said pressure housing.

22. The method of claim 21 further comprising sizing said detector assembly to be disposed in said open cavity within a radius defined by said outer surface of said drill collar, wherein a side of said pressure housing contacts environs of said borehole.

23. The method of claim 22 wherein said parameter is elemental composition.

24. The method of claim 22 wherein:
(a) said gamma radiation is capture gamma radiation induced by capture of neutrons, emitted by said neutron source, by an element in said material; and
(b) said parameter is concentration of said element in said material.

25. The method of claim 22 wherein:
(a) said gamma radiation is capture gamma radiation induced by capture of neutrons, emitted by said neutron source, by two elements in said material; and (b) said parameter is a ratio indicative of relative concentrations of said two elements in said material.

26. The method of claim 17 further comprising conveying said drill collar in said borehole with a drill string.

27. A method for measuring a ratio indicative of a relative amount of calcium and silicon within material penetrated by a borehole, comprising:
(a) disposing, within an open cavity in an outer surface of a tubular disposed within a borehole, a cylindrical detector assembly responsive to capture gamma radiation from calcium and silicon, wherein a side of said cylindrical detector assembly contacts environs of said borehole;
(b) obtaining measurements of said capture gamma radiation from calcium and silicon; and
(c) combining said measurements to obtain said ratio.

* * * * *